(12) United States Patent  (10) Patent No.: US 7,540,023 B2
Ito et al.  (45) Date of Patent: May 26, 2009

(54) INFORMATION PROCESSING APPARATUS AND AUTHENTICATION PROGRAM STORAGE MEDIUM

(75) Inventors: Hideto Ito, Kawasaki (JP); Naoki Iwasa, Kawasaki (JP); Haruhisa Sakuma, Kawasaki (JP); Makoto Kawasaki, Kawasaki (JP); Yoshihisa Harada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 766 days.

(21) Appl. No.: 10/895,392

(22) Filed: Jul. 21, 2004

(65) Prior Publication Data

US 2005/0010784 A1 Jan. 13, 2005

Related U.S. Application Data

(63) Continuation of application No. PCT/JP02/01602, filed on Feb. 22, 2002.

(51) Int. Cl.
*G06F 7/04* (2006.01)
*G06F 7/58* (2006.01)
*H04L 9/00* (2006.01)
*G06F 3/02* (2006.01)
*G06F 13/14* (2006.01)
*G06F 9/06* (2006.01)
*G06F 12/14* (2006.01)
*G06F 17/21* (2006.01)

(52) U.S. Cl. ............................ 726/20; 726/9; 713/168; 713/172

(58) Field of Classification Search ................ 726/20, 726/9
See application file for complete search history.

(56) References Cited

U.S. PATENT DOCUMENTS 5,721,835 A * 2/1998 Niwa et al. .................... 726/3

FOREIGN PATENT DOCUMENTS

GB 2423396 A * 8/2006

(Continued)

OTHER PUBLICATIONS

Gregory W. Bond, Eric Cheung, K. Hal Purdy, Pamela Zave, J. Christopher Ramming, An open architecture for next-generation telecommunication services, Feb. 2004, Transactions on Internet Technology (TOIT), vol. 4 Issue 1, pp. 83-123.*

(Continued)

*Primary Examiner*—Matthew B Smithers
*Assistant Examiner*—Courtney D Fields
(74) *Attorney, Agent, or Firm*—Fujitsu Patent Center

(57) ABSTRACT

The present invention has an object to provide an information processing apparatus and authentication program storage medium which can prevent unauthorized use reliably at low costs. The information processing apparatus has a connection section to which a device is removably connected and performs information processing using the device connected to the connection section. It is equipped with a condition setting section which establishes insertion/removal conditions for a device inserted into the connection section; and an authentication section which determines upon start-up of the information processing apparatus whether insertion/removal of a device satisfies the insertion/removal conditions established by the condition setting section, and permits the information processing apparatus to perform information processing if it is determined that the insertion/removal satisfies the established insertion/removal conditions.

8 Claims, 9 Drawing Sheets

FOREIGN PATENT DOCUMENTS

| | | |
|---|---|---|
| JP | 4-175916 | 6/1992 |
| JP | 7-219885 | 8/1995 |
| JP | 8-287309 | 11/1996 |
| JP | 9-190264 | 7/1997 |
| JP | 9-237183 | 9/1997 |
| JP | 11-015900 | 1/1999 |
| JP | 2000-353043 | 12/2000 |
| JP | 2001-014053 | 1/2001 |
| JP | 2002-032143 | 1/2002 |

OTHER PUBLICATIONS

Notice of Reasons for Rejection dated May 23, 2006 issued in corresponding Japanese Patent Application No. 2003-570230.

* cited by examiner

INFORMATION PROCESSING APPARATUS AND AUTHENTICATION PROGRAM STORAGE MEDIUM

This application is a continuing application, filed under 35 U.S.C. §111(a), of International Application PCT/JP02/01602, filed Feb. 22, 2002.

TECHNICAL FIELD

The present invention relates to an information processing apparatus which performs authentication processing using devices connected removably as well as to an authentication program storage medium.

BACKGROUND ART

Conventionally, various security measures are taken to prevent unauthorized use of information processing apparatus. For example, a predominant authentication scheme for personal computers and the like involves allowing an authorized user to register a password with a basic program known as BIOS (Basic Input Output System) and checking for authenticity of a user based on whether a password entered by the user upon start-up of the computer matches the registered password.

Furthermore, authentication schemes which utilize a smartcard or fingerprint matching are getting ready for commercialization in recent years.

However, with conventional password-based authentication schemes, security could be broken due to repeated attacks by unauthorized users, stolen passwords, or the like.

Also, although the authentication schemes which utilize a smartcard or fingerprint matching ensure tight security, they have a problem of increased costs because the smartcard-based authentication requires a special smartcard reader and the fingerprint authentication requires a fingerprint reader.

DISCLOSURE OF THE INVENTION

In view of the above circumstances, an object of the present invention is to provide an information processing apparatus and authentication program which can prevent unauthorized use reliably at low costs.

To achieve the above object, the present invention provides an information processing apparatus which has a connection section to which a device is removably connected and performs information processing using the device connected to the connection section, the information processing apparatus having:

a condition setting section which establishes insertion/removal conditions for a device inserted into the connection section; and an authentication section which determines upon start-up of the information processing apparatus whether insertion/removal of a device satisfies the insertion/removal conditions established by the condition setting section, and permits the information processing apparatus to perform information processing if it is determined that the insertion/removal satisfies the established insertion/removal conditions.

The "device" here means any of various peripheral devices widely used for recent personal computers, including storage devices, input/output devices, and communications devices.

The "connection section" here is provided in the main part of personal computer to connect the device and can be a PCMCIA (Personal Computer Memory Card International Association) connector, USB (Universal serial Bus) connector, IEEE 1394 (Institute of Electrical and Electronics Engineers 1394) connector, and PS/2 connector for a keyboard or mouse.

The information processing apparatus according to the present invention prevent unauthorized use reliably at low costs without using a dedicated security device because it becomes disabled unless device insertion/removal conditions established by an authorized user in advance are satisfied.

The condition setting section may establish the insertion/removal conditions using processes which include the process of recognizing actual insertion/removal of a device.

This configuration allows the information processing apparatus according to the present invention to prevent unauthorized use more reliably.

Also, the information processing apparatus may have multiple connection sections, characterized in that the condition setting section establishes insertion/removal conditions represented by an insertion/removal pattern of devices inserted and removed into/from the multiple connection sections.

This configuration also allows the information processing apparatus according to the present invention to prevent unauthorized use more reliably.

Furthermore, the information processing apparatus may have multiple connection sections, characterized in that the condition setting section establishes insertion/removal conditions represented by an insertion/removal pattern, taking into consideration timing of insertion/removal of devices into/from the connection sections.

This configuration allows the information processing apparatus according to the present invention to prevent unauthorized use still more reliably.

To achieve the above object, the present invention provides a computer-readable storage medium that stores an authentication program for performing an authentication process to determine whether to allow an information processing apparatus to perform information processing, where the information processing apparatus has a connection section to which a device is removably connected and performs information processing using the device connected to the connection section, the authentication program causing the information processing apparatus to implement:

a condition setting section which establishes insertion/removal conditions for a device inserted into the connection section; and an authentication section which determines upon start-up of the information processing apparatus whether insertion/removal of a device satisfies the insertion/removal conditions established by the condition setting section, and permits the information processing apparatus to perform information processing if it is determined that the insertion/removal satisfies the established insertion/removal conditions.

The authentication program storage medium according to the present invention makes it possible to configure an information processing apparatus which can prevent unauthorized use reliably at low costs.

Thus, the information processing apparatus according to the present invention can prevent unauthorized use reliably because it does not pass control to an operating system unless devices are inserted/removed according to established insertion/removal conditions.

Also, since the present invention makes it possible to change settings of an authentication system as required by selecting a combination of a device and connection section, time required for insertion/removal, and sequence of insertion/removal freely, it can maintain the level of security needed for the information processing apparatus.

Besides, since the present invention does not use a dedicated security device, it can prevent unauthorized use at low costs.

BEST MODE FOR CARRYING OUT THE INVENTION

An embodiment of the present invention will be described below.

First, hardware of an information processing apparatus according to this embodiment will be described.

Figure 1:
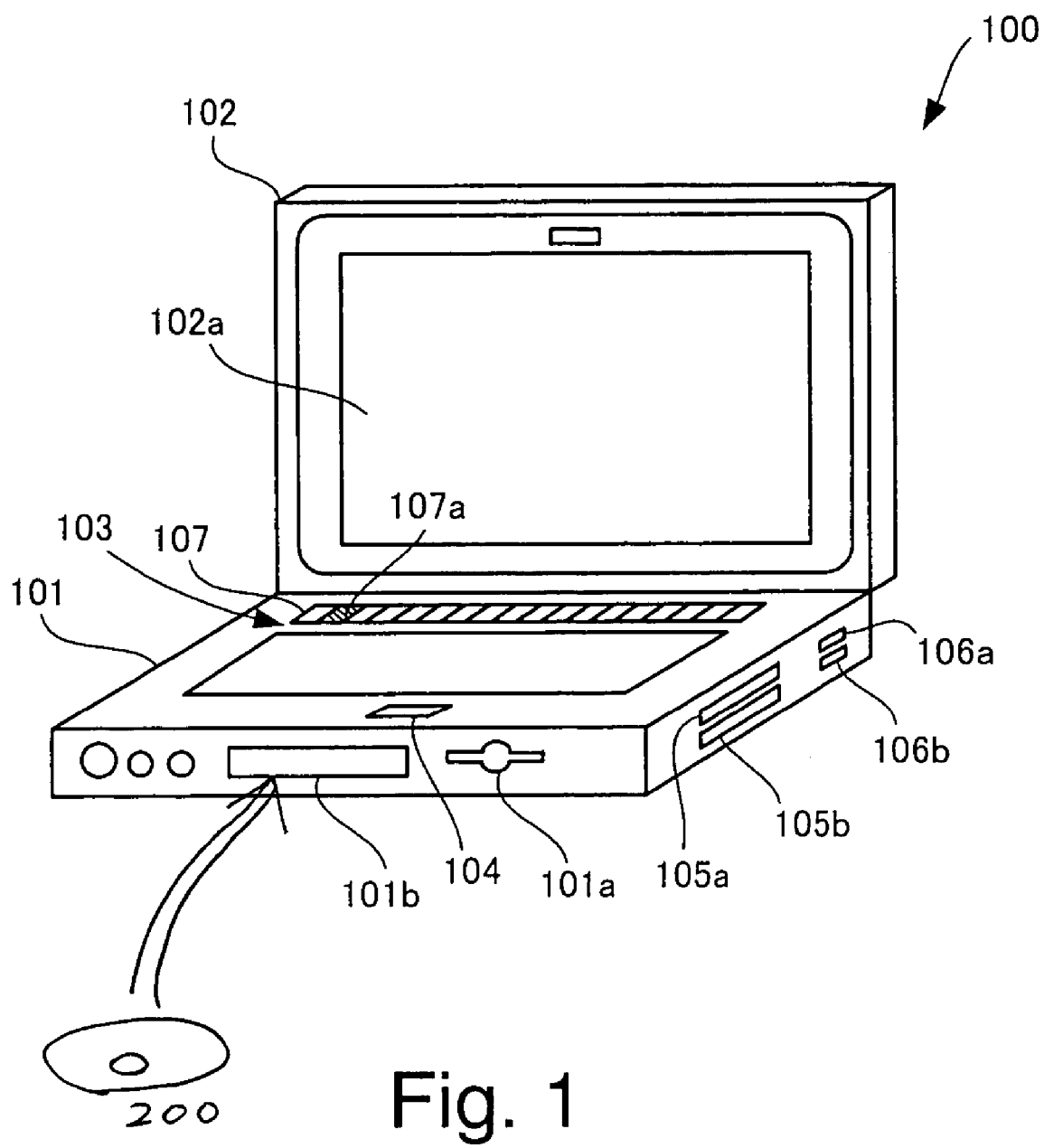
FIG. 1 is an external view of a computer system to which an information processing apparatus according to the present invention is applied.

FIG. 1 is an external view of a computer system to which the information processing apparatus according to the present invention is applied.

A notebook personal computer 100 is illustrated in FIG. 1 as an example.

The information processing apparatus according to the present invention is applicable not only to the notebook personal computer shown here, but also to desktop and handheld personal computers, PDAs (Personal Digital Assistants), workstations, and large computer systems.

The personal computer 100 has a main part 101 which contains a CPU (Central Processing Unit), a RAM (Random Access Memory), hard disk, a communications board; a display section 102 which displays images and character strings on a display screen 102a under instructions from the main part 101; a keyboard 103 for use by a user to enter commands in the personal computer 100; and a pointing device 104 used to enter a command by pointing to an icon or the like displayed on the display screen 102a. The keyboard 103 contains function keys 107 including an "F2" key 107a. The "F2" key 107a will be described later.

The front face of the main part 101 is provided with a flexible disk loading slot 101a and CD-ROM loading slot 101b into which a flexible disk (not shown) and CD-ROM 200 are loaded, respectively. A flexible disk drive and CD-ROM drive have been installed inside to drive the flexible disk and CD-ROM loaded into the slots 101a and 101b.

On the right flank of the main part 101, there are two PC card slots 105a and 105b into which PC cards (not shown) are inserted, two USB connectors 106a and 106b into which USB devices (not shown) are inserted, and so on.

On the left flank and rear face of the main part 101, there are a PS/2 connector (not shown) to which an external keyboard or mouse (not shown) is connected, a parallel connector (not shown) to which a parallel device is connected, serial connector to which a serial device is connected, and so on.

Figure 2:
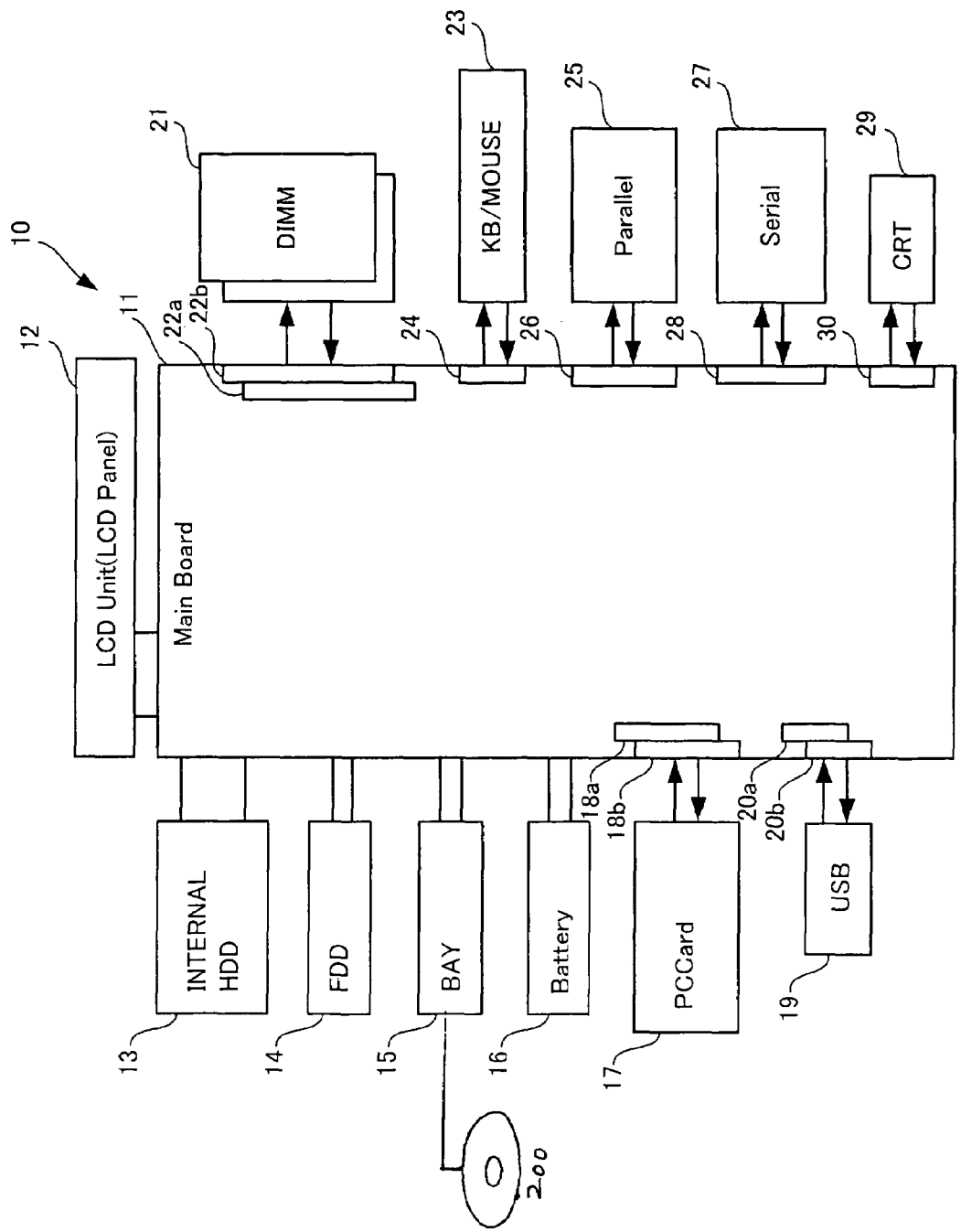
FIG. 2 is an internal block diagram of the personal computer shown in FIG. 1.

FIG. 2 is an internal block diagram of the personal computer shown in FIG. 1.

The figure shows a notebook personal computer 10 equipped with a main board 11 on which a CPU and the like are mounted as well as with an LCD (Liquid Crystal Display) panel 12 connected to the main board 11; built-in hard disk drive 13; flexible disk drive 14; peripherals mounting bay 15 for CD-ROM 200, DVD, and the like; built-in battery 16; and so on.

The main board 11 is equipped with two PCMCIA card slots 18a and 18b to which PCMCIA PC cards 17 are removably connected, two USB (Universal serial Bus) connectors 20a and 20b to which USB devices 19 are removably connected, two memory slots 22a and 22b to which DIMM (Double Inline Memory Module) memories 21 are removably connected, a PS/2 connector 24 to which a PS/2 device 23 such as a keyboard or mouse is removably connected, a parallel connector 26 to which a parallel device 25 such as a printer is removably connected, a serial connector 28 to which a serial device 27 such as a modem is removably connected, an external display-connector 30 to which an external display 29 such as a CRT (Cathode Ray Tube) is removably connected, and so on.

The PCMCIA PC cards 17, USB devices 19, DIMM memories 21, PS/2 device 23, parallel device 25, serial device 27, external display 29, and the like correspond to the devices according to the present invention. Also, the PCMCIA card slots 18a and 18b, USB connectors 20a and 20b, memory slots 22a and 22b, PS/2 connector 24, parallel connector 26, serial connector 28, external display connector 30, and the like correspond to the connection sections according to the present invention.

Figure 3:
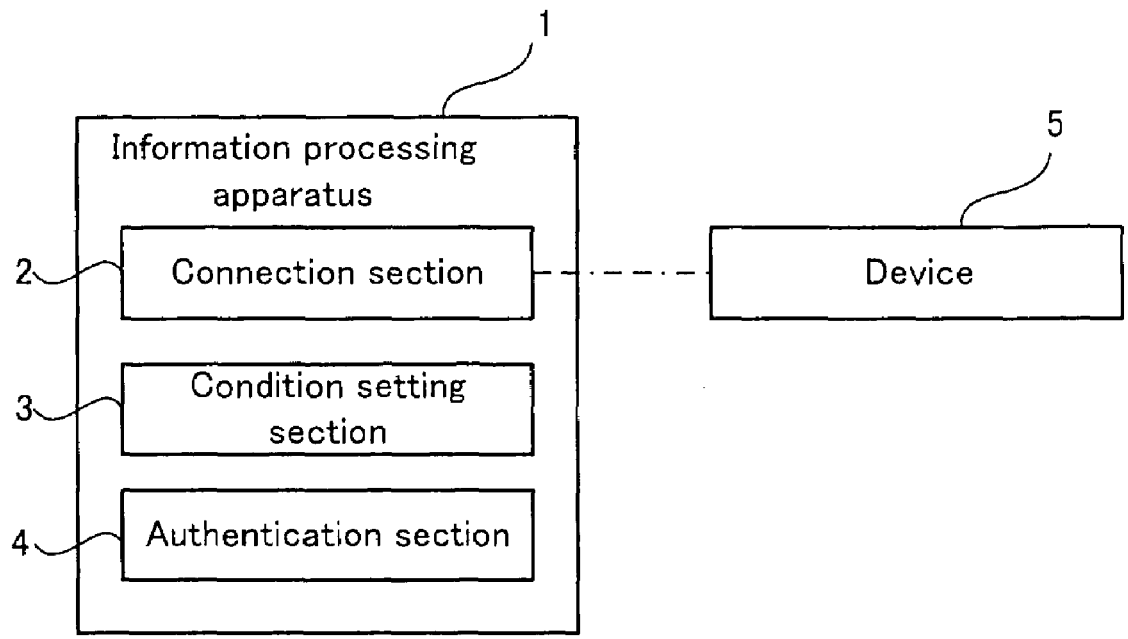
FIG. 3 is an overview functional block diagram showing an embodiment of the information processing apparatus according to the present invention.

FIG. 3 is an overview functional block diagram showing an embodiment of the information processing apparatus according to the present invention.

The information processing apparatus in FIG. 3 is constructed in the personal computer in FIGS. 1 and 2 when an authentication program described later is installed on the personal computer.

As shown in FIG. 3, the information processing apparatus 1 has a connection section 2 to which a device 5 is removably connected and performs information processing using the device 5 connected to the connection section 2. It is equipped with a condition setting section 3 which establishes insertion/removal conditions for a device 5 inserted into the connection section 2; and an authentication section 4 which determines upon start-up of the information processing apparatus 1 whether insertion/removal of a device 5 satisfies the insertion/removal conditions established by the condition setting section 3, and permits the information processing apparatus 1 to perform information processing if it is determined that the insertion/removal satisfies the established insertion/removal conditions.

Incidentally, the condition setting section 3 may establish the insertion/removal conditions using processes which include the process of recognizing actual insertion/removal of a device 5.

Also, the information processing apparatus 1 may have multiple connection sections 2 and the condition setting section 3 may establish insertion/removal conditions represented by an insertion/removal pattern of devices 5 inserted and removed into/from the multiple connection sections 2.

Furthermore, the condition setting section 3 may establish insertion/removal conditions represented by an insertion/removal pattern, taking into consideration timing of insertion/removal of devices 5 into/from the connection sections 2.

Figure 4:
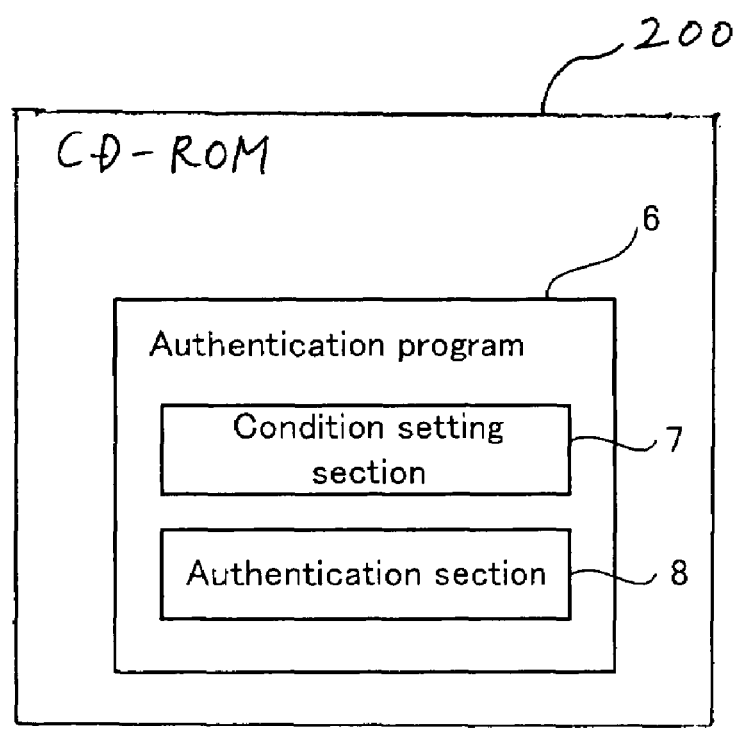
FIG. 4 is an overview block diagram of an authentication program stored in an authentication program storage medium according to the present invention.

FIG. 4 is an overview block diagram of an authentication program stored in an authentication program storage medium according to the present invention.

The authentication program is stored in the CD-ROM 200, and installed and runs on the personal computer shown in FIGS. 1 and 2. It performs an authentication process to determine whether to allow the information processing apparatus 1 to perform information processing, where the information processing apparatus 1 has the connection section 2 to which a device 5 is removably connected as shown in FIG. 3 and performs information processing using the device 5 connected to the connection section 2. The CD-ROM 200 corresponds to an authentication program storage medium according to the present invention in this embodiment. However, the authentication program storage medium according to the present invention is not limited to CD-ROM and may be any kind of storage medium.

As shown in FIG. 4, the authentication program 6 has a condition setting section 7 which establishes insertion/removal conditions for a device 5 inserted and removed into/from the connection section 2 of the information processing apparatus 1 (FIG. 3); and an authentication section 8 which determines upon start-up of the information processing apparatus 1 whether insertion/removal of a device 5 satisfies the insertion/removal conditions established by the condition setting section 7, and permits the information processing apparatus 1 to perform information processing if it is determined that the insertion/removal satisfies the established insertion/removal conditions.

Operation of the information processing apparatus and authentication program according to the present invention will be described below.

Figure 5:
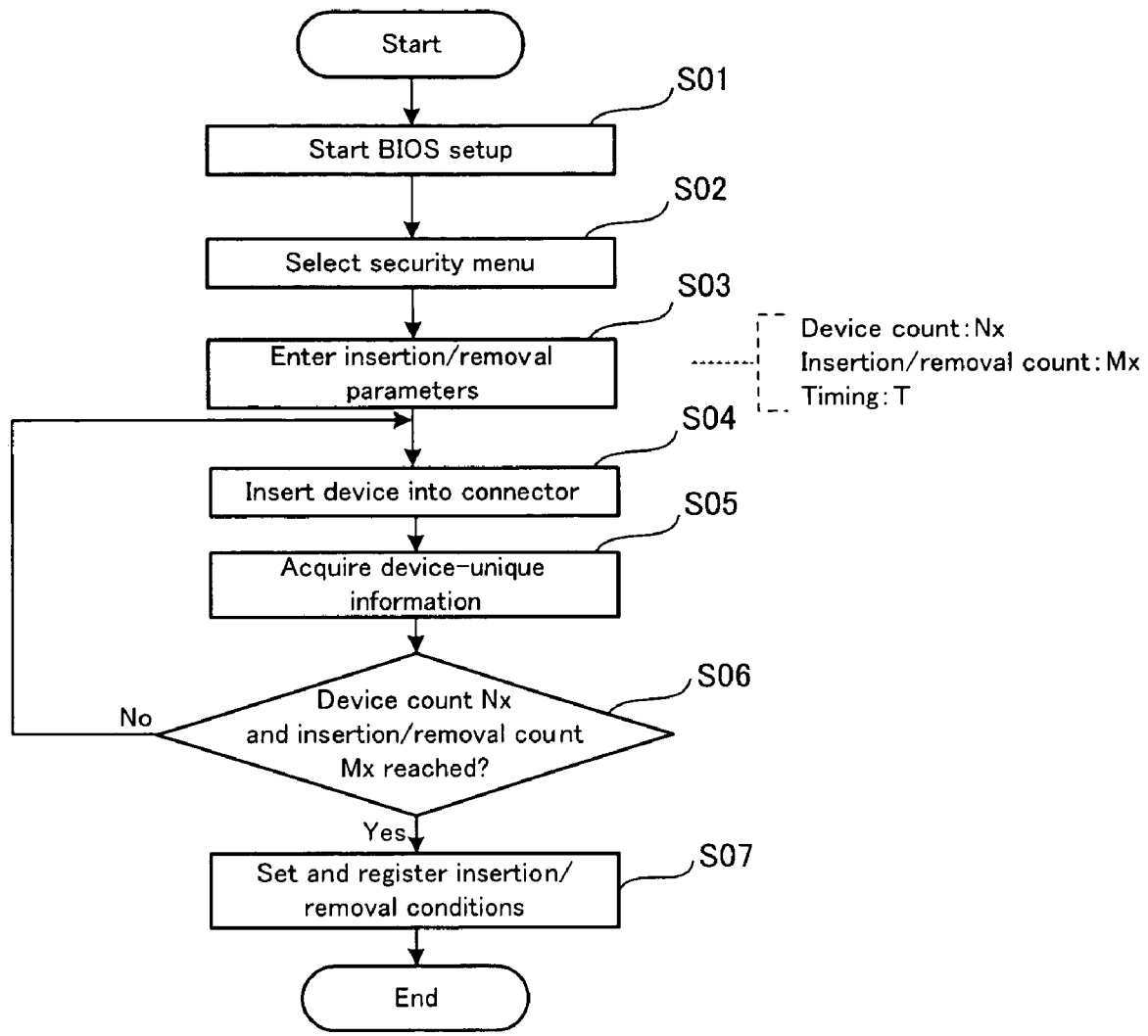
FIG. 5 is a flowchart showing operation of the information processing apparatus and authentication program according to this embodiment.

FIG. 5 is a flowchart showing the operation of the information processing apparatus and authentication program according to this embodiment.

The information processing apparatus according to this embodiment is a notebook personal computer. Among the function keys 107 at the top of the keyboard 103 (see FIG. 1), the second one from the left, for example, is the "F2" key 107a for starting BIOS. By pressing the "F2" key 107a at power-on, the user can enter BIOS setup.

As shown in FIG. 5, when the user presses the "F2" key 107a, a BIOS setup utility is started (Step S01).

Figure 6:
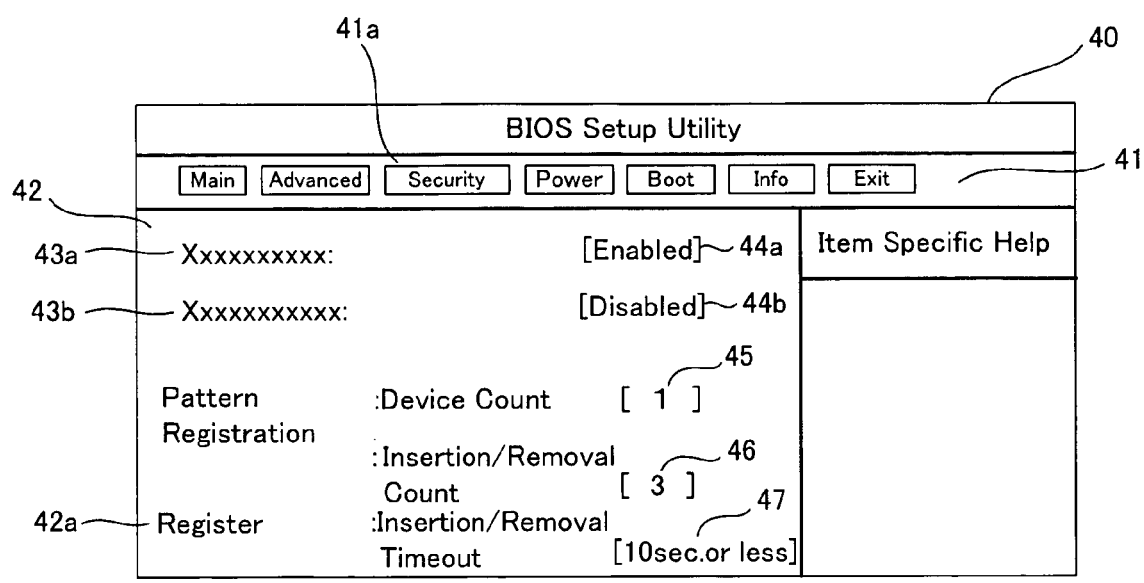
FIG. 6 is a diagram showing a BIOS setup utility screen.

FIG. 6 is a diagram showing a BIOS setup utility screen.

As shown in FIG. 6, the BIOS setup utility screen 40 contains a menu bar 41 which contains menus "Main," "Advanced," "Security," "Power," "Boot," "Info," and "Exit." When the user selects the "Security" menu 41a (Step S02), a parameter registration area 42 is brought up for the user to set insertion/removal conditions for devices 5 inserted and removed into/from the connection sections 2 of the information processing apparatus 1 (see FIG. 3).

To make a security setting by specifying, for example, that a PC card used as an authentication device should be inserted and removed three times, an authorized user enters parameters as follows (Step S03): enters "PC card" in a device name input field 43a among two device name input fields 43a and 43b, sets a setting field 44a to "Enabled," enters "1" in a Device Count input field 45, enters "3" in an Insertion/Removal Count input field 46, and enters "10 sec. or less" in an Insertion/Removal Timeout input field 47. Then, the user positions the cursor on a "Register" button 42a and presses the "Enter" key on the keyboard. This brings up a prompt screen described below.

Figure 7:
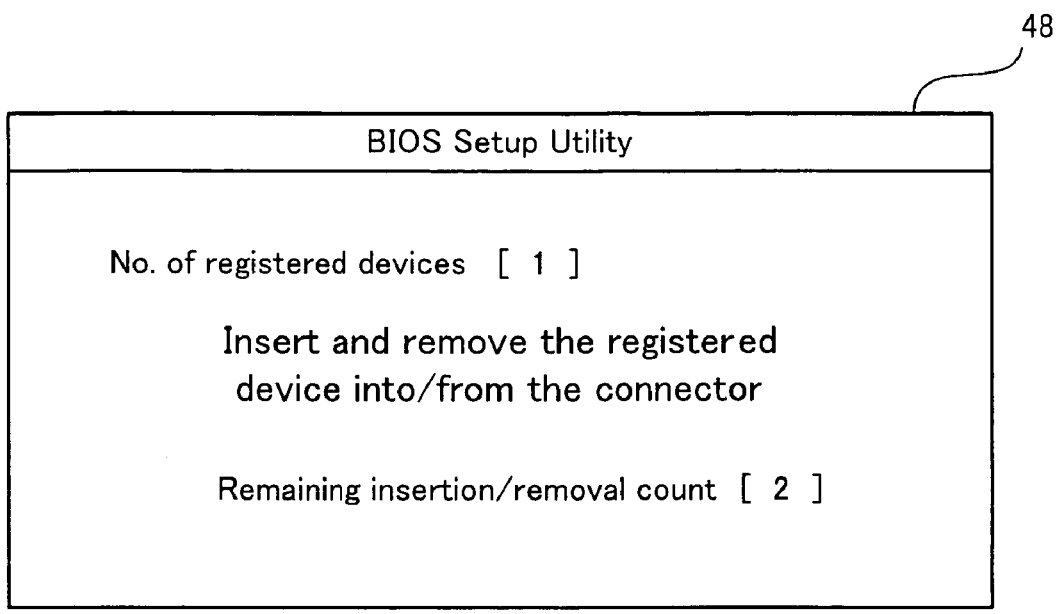
FIG. 7 is a diagram showing a prompt screen which prompts a user to insert/remove a device.

FIG. 7 is a diagram showing the prompt screen which prompts a user to insert/remove a device.

Following instructions on the prompt screen 48 shown in FIG. 7, the user inserts a device in the connection section 2 (see FIG. 3) (Step S04). The device inserted here is the specific device selected by the authorized user of the information processing apparatus to register the insertion/removal conditions.

Once the device 5 is inserted in the connection section 2 (see FIG. 3), the information processing apparatus 1 acquires information unique to the device 5, including the serial number and MAC address of the PC card (Step S05), and stores it in a predetermined location. When the device 5 is removed from the connection section 2 by the authorized user, the information processing apparatus 1 determines whether the device count and insertion/removal count specified in Step S03 have been reached (Step S06). If it is found that they have not been reached, the information processing apparatus 1 returns to Step S04 and repeats the above process until the device count and insertion/removal count specified in Step S03 are reached.

Figure 8:
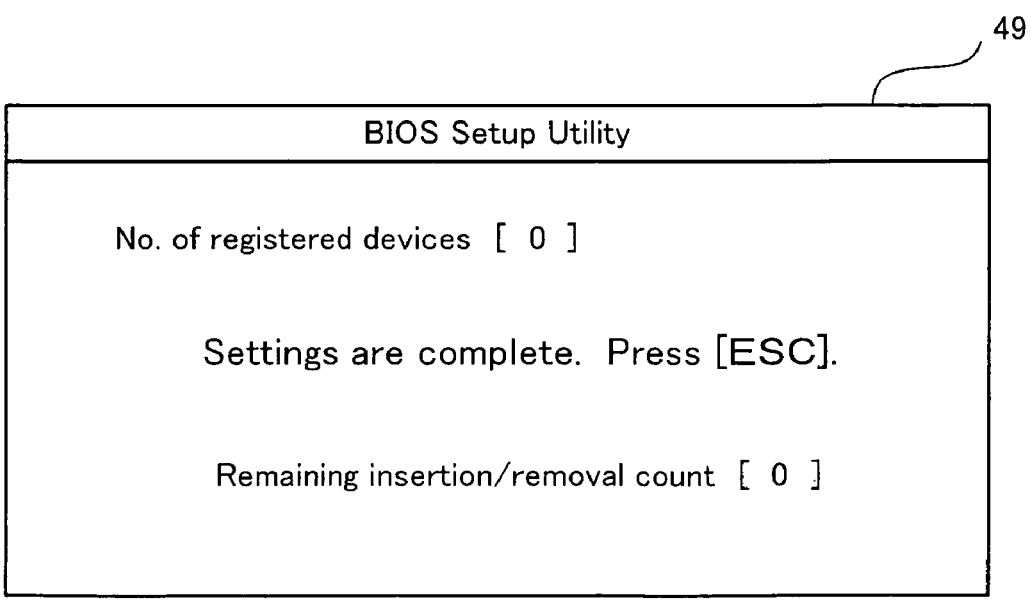
FIG. 8 is a diagram showing a screen which informs the user that setting of insertion/removal conditions is complete.

If it is found in Step S06 that the specified device count and insertion/removal count have been reached, a screen 49 shown in FIG. 8 appears.

FIG. 8 is a diagram showing a screen which informs the user that setting of insertion/removal conditions is complete.

When the user presses the [ESC] key following a message on the screen 49 shown in FIG. 8, he/she is taken to Step S07 of the flowchart shown in FIG. 5, and the condition setting section 3 (see FIG. 3) sets the insertion/removal conditions of the devices and returns to the BIOS setup utility screen 40 shown in FIG. 6.

When the user positions the cursor on a message "Save Changes" displayed in the BIOS setup utility screen 40 and presses the [ENTER] key, the system reboots and the setting and registration of insertion/removal conditions are complete.

Concrete examples of insertion/removal conditions will be described.

EXAMPLE 1

According to example 1, the user enters parameters including device count N=1, insertion/removal count M=3, insertion/removal timeout T=10 sec. or less and sets an insertion/removal condition represented by an insertion/removal pattern shown in Table 1 by inserting and removing a PC card three times in the order: PC card slot A, PC card slot B, and PC card slot A. Then, the insertion/removal condition is registered in a non-volatile memory (not shown) mounted on the main board 11 of the personal computer 10 (see FIG. 2).

TABLE 1

| | |
|---|---|
| Device count (N) | 1 |
| Insertion/removal count (M) | 3 |

TABLE 1-continued

| | |
|---|---|
| Insertion/removal timeout (T) | 10 sec. or less |
| PC card | PC card slot A |
| PC card | PC card slot B |
| PC card | PC card slot A |

EXAMPLE 2

According to example 2, the user enters parameters including device count N=2, insertion/removal count M=5, insertion/removal timeout T=20 sec. or less and sets an insertion/removal condition represented by an insertion/removal pattern shown in Table 2 by inserting and removing a PC card five times in the following order: inserting and removing a PC card X into/from a PC card slot A, inserting and removing a PC card Y into/from a PC card slot B, inserting and removing a PC card X into/from a PC card slot B, inserting and removing a PC card Y into/from a PC card slot A, and inserting and removing a PC card X into/from a PC card slot B. Then, the insertion/removal condition is registered in the non-volatile memory (not shown) mounted on the main board 11 of the personal computer 10 (see FIG. 2).

TABLE 2

| | |
|---|---|
| Device count (N) | 2 |
| Insertion/removal count (M) | 5 |
| Insertion/removal timeout (T) | 20 sec. or less |
| PC card X | PC card slot A |
| PC card Y | PC card slot B |
| PC card X | PC card slot B |
| PC card Y | PC card slot A |
| PC card X | PC card slot B |

As in the case of the above examples, when device insertion/removal conditions are established, the information processing apparatus is protected from unauthorized use.

Next, description will be given of an authentication process performed by the information processing apparatus protected by the device insertion/removal conditions thus established.

When the information processing apparatus is turned on, an authentication operation screen described below appears.

Figure 9:
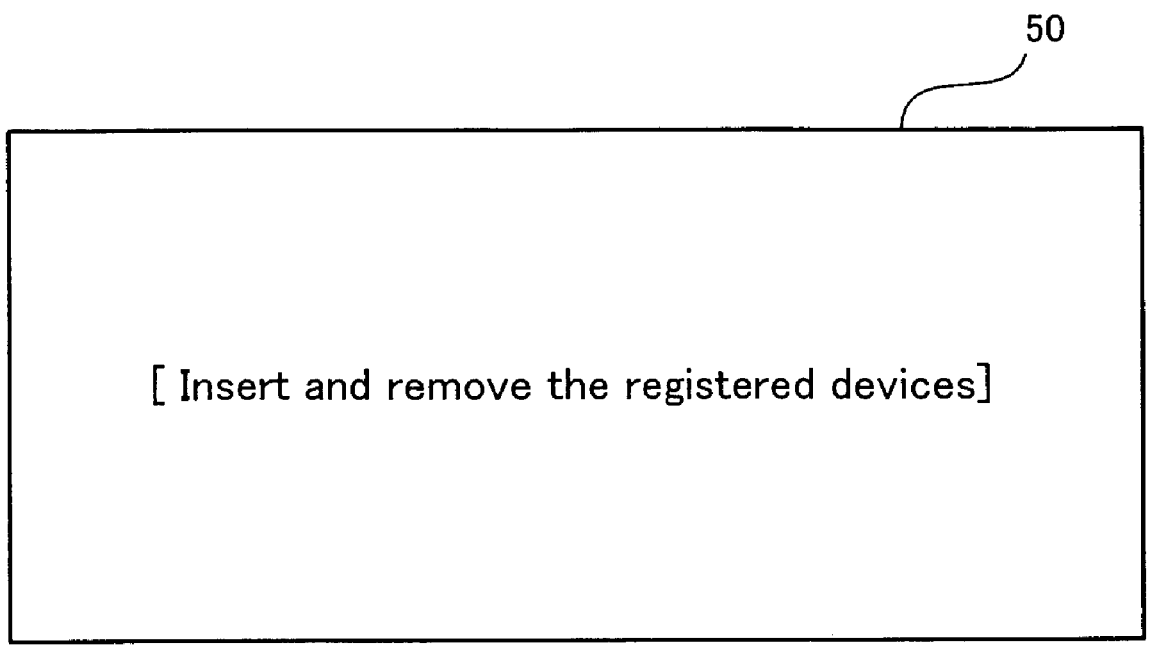
FIG. 9 is a diagram showing an authentication operation screen displayed upon start-up of the information processing apparatus according to this embodiment.

FIG. 9 is a diagram showing an authentication operation screen displayed upon start-up of the information processing apparatus according to the present invention.

When the user inserts and removes devices following a prompt on the authentication operation screen 50, the authentication section 4 (see FIG. 3) of the information processing apparatus performs an authentication process as follows.

Figure 10:
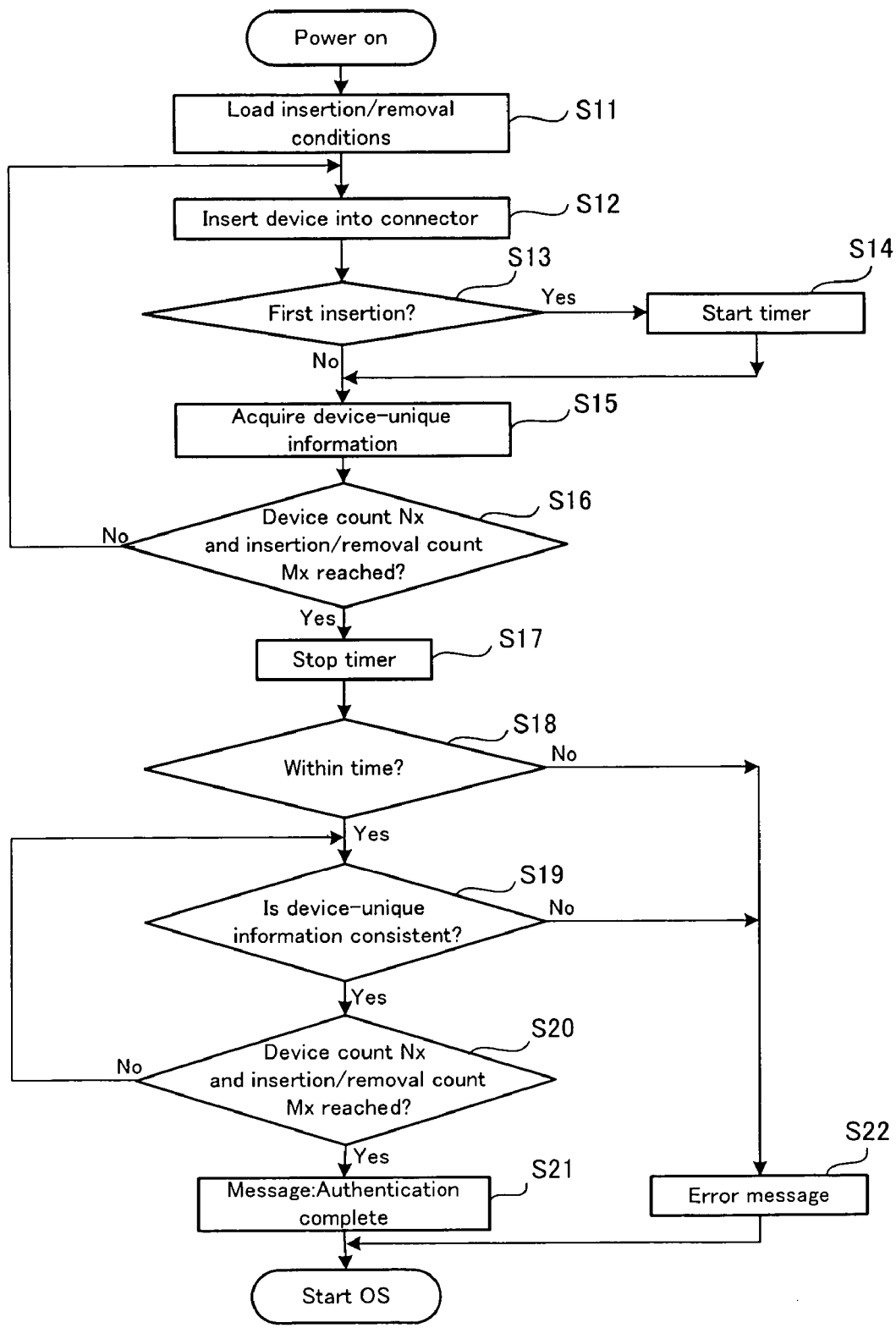
FIG. 10 is a flowchart of an authentication process according to this embodiment.

FIG. 10 is a flowchart of the authentication process according to this embodiment.

As shown in FIG. 10, first, insertion/removal conditions specified for the information processing apparatus are loaded (Step S11). Then, a device which has been registered in relation to the insertion/removal conditions is inserted into a connection section 2 (see FIG. 3) by the user (Step S12).

If the conditions shown in example 1 have been specified for the information processing apparatus, the user inserts the PC card, the one inserted during the insertion/removal condition setting, into the PC card slot A (Step S13). A timer is started at the time of the first insertion (Step S14), but remains unchanged at the time of subsequent insertions. Then, the information processing apparatus acquires information unique to the inserted device, including, for example, the serial number and MAC address, and stores it in a non-volatile memory or the like (Step S15).

When the user removes the PC card from the PC card slot A, the information processing apparatus 1 determines whether the device count and insertion/removal count specified at the time of the insertion/removal condition setting have been reached (Step S16). If they have not been reached, the information processing apparatus 1 returns to Step S12 and repeats the above process until the specified device count and insertion/removal count are reached.

When the PC card is inserted and removed three times into/from the PC card slot A, PC card slot B, and PC card slot A in this order, the information processing apparatus 1 stops the timer (Step S17) and determines whether the time indicated by the timer falls within 10 seconds (Step S18). If it is found that the time "T<10 sec." specified in the insertion/removal condition setting is not satisfied, the information processing apparatus 1 displays an error message screen 51 described below (Step S22) and terminates all processing.

Figure 11:
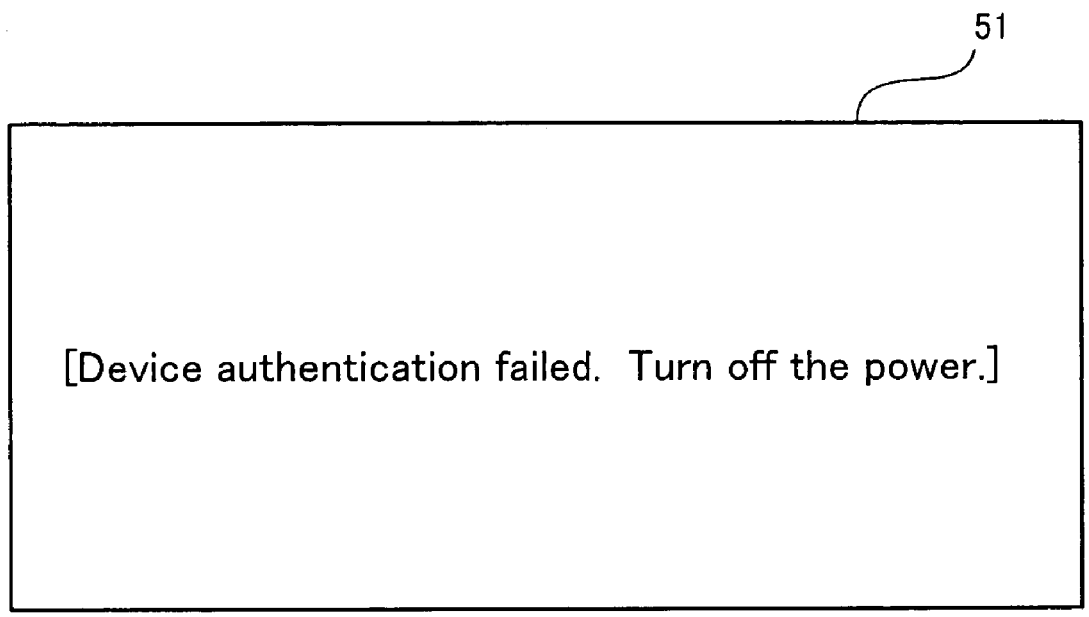
FIG. 11 is a diagram showing an error message screen displayed if authentication fails.

FIG. 11 is a diagram showing an error message screen displayed if authentication fails.

If it is found in Step S18 that the time indicated by the timer satisfies the insertion/removal condition, the information processing apparatus 1 determines whether the acquired information unique to the device matches the device-unique information specified at the time of the insertion/removal condition setting (Step S19). If it is found that they do not match, the information processing apparatus 1 displays the error message screen 51 shown in FIG. 11 (Step S22) and terminates all processing.

On the other hand, if it is found in Step S19 that the acquired device-unique information matches the specified device-unique information, the information processing apparatus 1 determines whether the device count and insertion/removal count specified at the time of the insertion/removal condition setting have been reached (Step S20). If they have not been reached, the information processing apparatus 1 returns to Step S19 and repeats the above process until the specified device count and insertion/removal count are reached.

When the specified device count and insertion/removal. count are reached, an authentication completion message screen 52 (see FIG. 6) described below appears (Step S21).

Figure 12:
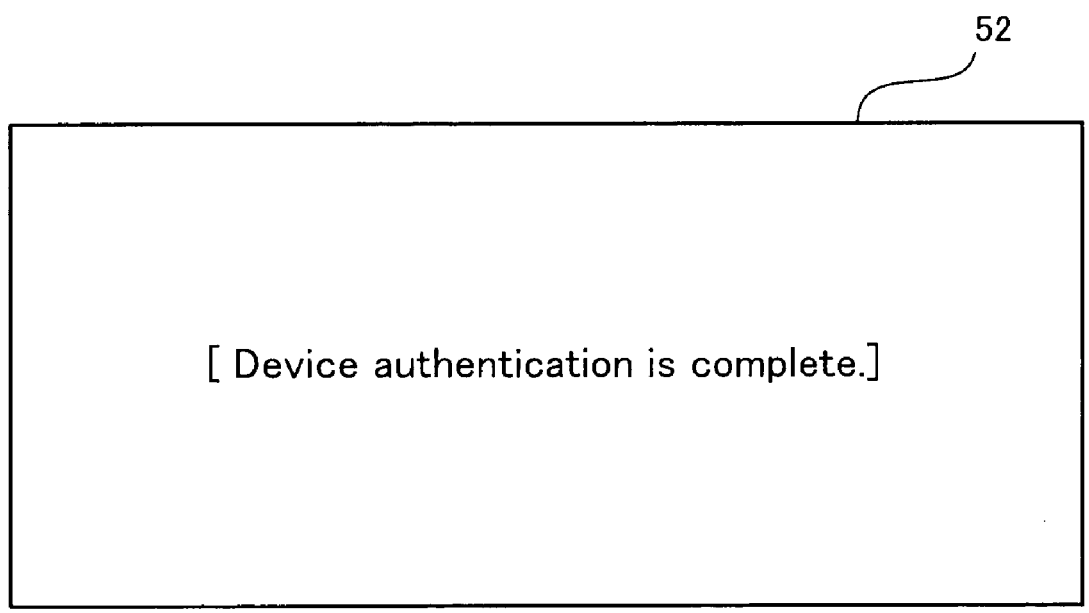
FIG. 12 is a diagram showing a screen displayed when authentication is complete.

FIG. 12 is a diagram showing a screen displayed when authentication is complete.

As shown in FIG. 12, a message "Device authentication is complete" appears. When the user presses the [Enter] key, the OS starts up.

Incidentally, according to the above embodiment, information unique to a device is acquired and registered in a predetermined location at the time of insertion/removal condition setting, and then information unique to a device is acquired during an authentication process and checked for match against the registered unique information, but it is not strictly necessary for the present invention to use information unique to a device for authentication. Insertion/removal conditions may be set without using unique information. However, from the viewpoint of improving a security level, it is desirable to use information unique to a device in conjunction.

Also, according to the above embodiment, at the time of insertion/removal condition setting, insertion/removal parameters are input in the first stage and an insertion/removal condition is specified by actually inserting and removing specific devices into/from specific connection sections in the second stage, but it is not strictly necessary for the present invention to set insertion/removal conditions in two stages. For example, it is possible to enter detailed conditions on the screen, omitting actual insertion/removal operations. However, from the viewpoint of improving a security level, it is desirable to set insertion/removal conditions in two stages.

The invention claimed is:

1. An information processing apparatus which has a connection section to which a device is removably connected and which performs information processing using the device connected to the connection section, the information processing apparatus comprising:
   a condition setting section which establishes insertion/removal conditions, for a device inserted and removed into/from the connection section, including an insertion/removal count and an insertion/removal timeout period for the insertion/removal count; and
   an authentication section which determines upon start-up of the information processing apparatus whether insertion/removal of a device satisfies the insertion/removal conditions established by the condition setting section, and permits the information processing apparatus to perform information processing if it is determined that the insertion/removal satisfies the established insertion/removal conditions.

2. The information processing apparatus according to claim 1, wherein the condition setting section establishes the insertion/removal conditions using processes which include the process of recognizing actual insertion/removal of a device.

3. The information processing apparatus according to claim 1 comprising:
   a plurality of the connection sections,
      wherein the condition setting section establishes insertion/removal conditions represented by an insertion/removal pattern of devices inserted and removed into/from the plurality of connection sections.

4. The information processing apparatus according to claim 1, wherein the condition setting section establishes insertion/removal conditions represented by an insertion/removal pattern, taking into consideration timing of insertion/removal of devices into/from the connection sections.

5. A computer-readable storage medium that stores an authentication program for performing an authentication process to determine whether to allow an information processing apparatus to perform information processing, where the information processing apparatus has a connection section to which a device is removably connected and performs information processing using the device connected to the connection section, the authentication program causing the information processing apparatus to implement:
   a condition setting section which establishes insertion/removal conditions, for a device inserted and removed into/from the connection section, including an allowable insertion/removal count and an insertion/removal timeout period required for the allowable insertion/removal count; and
   an authentication section which determines upon start-up of the information processing apparatus whether insertion/removal of a device satisfies the insertion/removal conditions established by the condition setting section, and permits the information processing apparatus to perform information processing if it is determined that the insertion/removal satisfies the established insertion/removal conditions.

6. The information processing apparatus according to claim 2, wherein the condition setting section establishes insertion/removal conditions represented by an insertion/removal pattern, taking into consideration timing of insertion/removal of devices into/from the connection sections.

7. The information processing apparatus according to claim 3, wherein the condition setting section establishes insertion/removal conditions represented by an insertion/removal pattern, taking into consideration timing of insertion/removal of devices into/from the connection sections.

8. A storage medium that stores an authentication program, which when executed by the computer, causes the computer to execute a process comprising:
   establishing insertion/removal conditions, for a device inserted and removed into/from the connection section of an apparatus, including an allowable insertion/removal count and an insertion/removal timeout period required for the allowable insertion/removal count;
   determining upon start-up of the apparatus whether insertion/removal of a device satisfies the established insertion/removal conditions section; and
   permitting information processing upon determining that the insertion/removal satisfies the established insertion/removal conditions.

* * * * *